United States Patent
Jeong

(10) Patent No.: US 10,766,000 B2
(45) Date of Patent: Sep. 8, 2020

(54) NANOFIBER FOR FILTER MEDIUM, FILTER MEDIUM COMPRISING SAME, METHOD FOR PRODUCING SAME, AND FILTER UNIT COMPRISING SAME

(71) Applicant: AMOGREENTECH CO., LTD., Gyeonggi-do (KR)

(72) Inventor: Ui Young Jeong, Incheon (KR)

(73) Assignee: AMOGREENTECH CO., LTD., Gyeonggi-do (KR)

( * ) Notice: Subject to any disclaimer, the term of this patent is extended or adjusted under 35 U.S.C. 154(b) by 223 days.

(21) Appl. No.: 15/752,163

(22) PCT Filed: Aug. 16, 2016

(86) PCT No.: PCT/KR2016/008991
§ 371 (c)(1),
(2) Date: Feb. 12, 2018

(87) PCT Pub. No.: WO2017/026876
PCT Pub. Date: Feb. 16, 2017

(65) Prior Publication Data
US 2018/0236403 A1   Aug. 23, 2018

(30) Foreign Application Priority Data
Aug. 13, 2015   (KR) .................. 10-2015-0114559

(51) Int. Cl.
*B01D 61/02*   (2006.01)
*C02F 1/44*   (2006.01)
(Continued)

(52) U.S. Cl.
CPC ......... *B01D 61/027* (2013.01); *B01D 63/081* (2013.01); *B01D 63/14* (2013.01);
(Continued)

(58) Field of Classification Search
None
See application file for complete search history.

(56) References Cited

U.S. PATENT DOCUMENTS

2013/0118973 A1*   5/2013   Seo .................... B01D 39/1623
                                                                 210/435

FOREIGN PATENT DOCUMENTS

CN          102872729         1/2013
JP          2003311263        11/2003
(Continued)

OTHER PUBLICATIONS

Dow Surfactants, Reference Chart, 2014, pp. 1-12. (Year: 2014).*
(Continued)

*Primary Examiner* — Clare M Perrin
(74) *Attorney, Agent, or Firm* — Norton Rose Fulbright US LLP

(57) ABSTRACT

A nanofiber for a filter medium is provided that includes fiber-forming ingredients including polyacrylonitrile (PAN) and polyvinylidene fluoride (PVDF) and an emulsifying agent for improving the miscibility of the fiber-forming ingredients. The nanofiber has excellent mechanical strength and chemical resistance and, at the same time, significantly increased hydrophilicity without a separate surface modification/treatment to/on the nanofiber. A filter medium comprising said nanofiber can exhibit improved flux and filtration efficiency and excellent physical properties in a water treatment process in which a pressure equal to or more than a predetermined level is applied and which requires the filter medium to have high mechanical strength and in a water treatment process which requires chemical resistance as the liquid being filtered is strongly acidic or alkaline. Further, since the nanofiber has significantly superior spinnability, (Continued)

the mass productivity of the filter medium is significantly improved, and the unit costs of production can be reduced.

9 Claims, 4 Drawing Sheets

(51) Int. Cl.
*D04H 1/43* (2012.01)
*D04H 1/4382* (2012.01)
*B01D 63/14* (2006.01)
*B01D 69/10* (2006.01)
*B01D 69/02* (2006.01)
*B01D 71/34* (2006.01)
*B01D 67/00* (2006.01)
*B01D 69/12* (2006.01)
*B01D 71/42* (2006.01)
*B01D 63/08* (2006.01)
*D04H 1/4318* (2012.01)
*D04H 1/4374* (2012.01)
*D04H 1/548* (2012.01)
*D04H 1/728* (2012.01)
*B01D 61/14* (2006.01)

(52) U.S. Cl.
CPC ......... *B01D 67/0004* (2013.01); *B01D 69/02* (2013.01); *B01D 69/10* (2013.01); *B01D 69/12* (2013.01); *B01D 71/34* (2013.01); *B01D 71/42* (2013.01); *C02F 1/44* (2013.01); *C02F 1/442* (2013.01); *D04H 1/43* (2013.01); *D04H 1/4318* (2013.01); *D04H 1/4374* (2013.01); *D04H 1/4382* (2013.01); *D04H 1/548* (2013.01); *D04H 1/728* (2013.01); *B01D 61/145* (2013.01); *B01D 2323/39* (2013.01); *B01D 2325/36* (2013.01); *C02F 2305/08* (2013.01)

(56) References Cited

FOREIGN PATENT DOCUMENTS

| KR | 200233744 | | 10/2001 | |
|----|-----------|---|---------|---|
| KR | 20140103866 | | 8/2008 | |
| KR | 100871440 | | 12/2008 | |
| KR | 100871440 B1 | * | 12/2008 | |
| KR | 20110046907 | | 5/2011 | |
| KR | 20130057973 | | 6/2013 | |
| KR | 20140025579 | | 3/2014 | |
| KR | 20140038157 | | 3/2014 | |
| KR | 20140103866 A | * | 8/2014 | ........... D01D 5/0084 |
| KR | 20140137197 | | 12/2014 | |
| KR | 20140142018 | | 12/2014 | |
| WO | WO 2010/011984 | | 1/2010 | |

OTHER PUBLICATIONS

Machine translation of KR-100871440B1, pp. 1-4. (Year: 2008).*
International Search Report and Written Opinion Issued in Corresponding International Application No. PCT/KR2016/008991, dated Dec. 16, 2016.

* cited by examiner

NANOFIBER FOR FILTER MEDIUM, FILTER MEDIUM COMPRISING SAME, METHOD FOR PRODUCING SAME, AND FILTER UNIT COMPRISING SAME

CROSS-REFERENCE TO RELATED APPLICATIONS

This application is a national phase application under 35 U.S.C. § 371 of International Application No. PCT/KR2016/008991, filed Aug. 16, 2016, which claims priority to Korean Application No. 10-2015-0114559, filed Aug. 13, 2015. The contents of the referenced applications are incorporated into the present application by reference.

FIELD OF THE DISCLOSURE

The present invention relates to a nanofiber for a filter medium, and more specifically, a nanofiber for a filter medium in which mechanical strength and chemical resistance of the nanofiber are improved and flux is significantly increased, a filter medium including the same, a method of preparing the same and a filter assembly including the same.

DESCRIPTION OF RELATED ART

A filter medium may be classified into a microfiltration (MF) membrane, an ultrafiltration (UF) membrane, a nanofilter (NF) medium or a reverse osmosis (RO) membrane depending on pore size. The aforementioned filter media are different in the use and pore size thereof, but have a common feature of being filtration media formed of fibers or porous polymer filtration media, or having a form of a composite membrane thereof. Generally, the porous polymer filter media may be formed by a method of forming pores in a polymer membrane or a polymer hollow fiber using a separate pore forming agent contained in a solution by sintering the pore forming agent or dissolving the pore forming agent in an external coagulating solution. On the other hand, the filter media formed of the fibers are generally prepared by accumulating produced short fibers and then applying heat, pressure or the like, or applying heat, pressure or the like while spinning.

A typical example of the filtration media formed of the fibers is a nonwoven fabric. In general, the porosity of the nonwoven fabric is controlled by the diameter of a short fiber, a basis weight of the medium, etc. However, since the diameter of the short fibers included in the general nonwoven fabric is in the unit of microns, there is a limitation in implementing a filter media having a fine and uniform pore structure only by controlling the diameter and basis weight of the fibers. Accordingly, only a filter medium such as a microfiltration membrane may be implemented using a general nonwoven fabric, and it is difficult to implement a filter medium such as an ultrafiltration membrane or a nano filter medium for filtering finer particles.

A method designed to solve the problem is a filter medium formed of microfibers having a nanoscale fiber diameter. However, it is difficult for microfibers having a nanoscale diameter to be prepared by only spinning once by a general fiber pinning process such as a wet spinning process, and it is necessary to be spun as island-in-the-sea yarns or the like and separately eluting a sea component to obtain an island component which is a microfiber, and thus there are problems of inconvenience, a cost increase, extension of production time. Accordingly, there has been a tendency to prepare a fiber having a nanoscale diameter through electro spinning and to produce a large number of filtration media implemented thereby, recently.

On the other hand, one of the physical properties suitable for water treatment application is flux, which is influenced by the degree of hydrophilicity of the filter medium as well as the porosity, pore size and pore structure of the filter medium. In the case of a filter medium having poor hydrophilicity, the flux is improved by a method such as plasma treatment, surface modification with a hydrophilic group, or coating with a separate hydrophilic layer, etc. Specifically, Korean Patent No. 10-1447268 relates to a filter medium including a porous layer formed of electrospun PVDF fibers, and discloses a filter medium in which a hydrophilic functional group is introduced into the surface of the porous layer to improve hydrophilicity of the porous layer. However, while the PVDF fiber exhibits excellent physical properties in terms of mechanical strength and chemical resistance, the material itself exhibits high hydrophobicity, so that it is difficult to secure a desired level of flux due to insufficient hydrophilicity of a filter medium only by including a hydrophilic functional group, and there are problems of inconvenience in processes and a cost increase caused by including a hydrophilic functional group in the nanofiber, separately from the obtained flux.

Further, in order to solve the problems, there has been proposed a method of coating a PVDF nanofiber with two types of polymer compounds having high hydrophilicity. However, there are problems of frequent interfacial separation, peeling, and separation between the nanofibers and a coating layer due to different properties of the two polymer compounds despite coating.

In order to solve the problem of separation of a hydrophilic coating layer, it may be considered to mix the two types of polymer compounds having high hydrophilicity with PVDF and perform spinning. In this case, the two types of polymer compounds are separated from each other in a spinning solution before spinning, so that a spun nanofiber has a structure, in which the two types of polymer compounds are separated and disposed such as a case where the hydrophilic polymer is disposed at a portion of the fiber and only PVDF is disposed at another portion, instead of being in a state in which two types of polymer compounds are uniformly mixed. Accordingly, spinnability of the nanofiber itself is poor, and even in a case in which a filter medium is prepared using the nanofiber, it is difficult to expect significant improvement of chemical resistance and flux, and mechanical strength is notably reduced, resulting in poor durability.

Accordingly, there is an urgent need for the development of a nanofiber for a filter medium which satisfies water permeability, filtration efficiency, mechanical strength, and chemical resistance, exhibits excellent hydrophilicity without separately modifying the prepared nanofiber, and has significantly improved spinnability, and a preparation method thereof.

SUMMARY OF THE INVENTION

An aspect of the present invention is directed to a nanofiber for a filter medium having excellent mechanical strength and chemical resistance due to the nanofiber and significantly increased hydrophilicity without separate surface modification and treatment.

Another aspect of the present invention is directed to a method of preparing a nanofiber for a filter medium having improved hydrophilicity and chemical resistance of the nanofiber and excellent spinnability.

Still another aspect of the present invention is directed to a filter medium which may be effectively used in a water treatment process in which a certain level of pressure is applied and a water treatment process in which chemical resistance is required because the water to be treated is strongly acidic or alkaline, and may exhibit improved flux and filtration efficiency by using the nanofiber according to the present invention with excellent hydrophilicity, chemical resistance and mechanical strength, a filter unit which includes the filter medium and is usable in various water treatment devices, and a filter module.

Still another aspect of the present invention is directed to a method of preparing a filter medium by which the filter medium may have significantly improved mass productivity due to excellent spinnability, and the unit costs of production may be reduced.

According to an embodiment of the present invention, there is provided nanofiber for a filter medium, including: fiber-forming ingredients including polyacrylonitrile (PAN) and polyvinylidene fluoride (PVDF); and an emulsifying agent for improving the miscibility of the fiber-forming ingredients.

According to one embodiment of the present invention, the fiber-forming ingredients may include polyacrylonitrile at 8 to 20 parts by weight based on 100 parts by weight of polyvinylidene fluoride.

Further, the nanofiber may include an emulsifying agent at 0.5 to 8 parts by weight based on 100 parts by weight of the fiber-forming ingredients. In order to improve spinnability, the emulsifying agent is preferably a nonionic emulsifying agent, and more preferably a nonionic emulsifying agent having a hydrophile-lipophile balance (HLB) in the range of 10 to 18.

Further, the present invention provides a method of preparing a nanofiber for a filter medium, including: (a) preparing a spinning solution including fiber-forming ingredients including polyacrylonitrile (PAN) and polyvinylidene fluoride (PVDF) and an emulsifying agent for improving the miscibility of the fiber-forming ingredients; and (b) electrospinning the spinning solution.

According to one embodiment of the present invention, the fiber-forming ingredients may include polyacrylonitrile at 8 to 20 parts by weight based on 100 parts by weight of polyvinylidene fluoride.

Further, the spinning solution may include an emulsifying agent at 0.5 to 8 parts by weight based on 100 parts by weight of the fiber-forming ingredients, and the emulsifying agent may satisfy a hydrophile-lipophile balance (HLB) in the range of 10 to 18, and the emulsifying agent may be preferably a nonionic emulsifying agent in order to improve spinnability.

Further, the present invention provides a filter medium, including a fiber web layer having a three-dimensional network structure and formed of a nanofiber which includes fiber-forming ingredients including polyacrylonitrile (PAN) and polyvinylidene fluoride (PVDF) and an emulsifying agent for improving the miscibility of the fiber-forming ingredients.

According to one embodiment of the present invention, the filter medium may further include a support layer formed on at least one surface of the fiber web layer. The support layer may be at least one of a nonwoven fabric, a woven fabric and a knitted fabric, and at least one thereof may include a polyolefin-based or polyester-based low melting point composite fiber.

Further, the fiber web layer may have a thickness in a range of 0.5 to 200 µm, a porosity in a range of 40 to 90%, an average pore size in a range of 0.1 to 5 µm, and a basis weight in a range of 0.5 to 100 g/m².

Further, the diameter of the nanofiber may be in the range of 0.05 to 2 µm.

Further, in order to improve spinnability, the emulsifying agent included in the nanofiber may be preferably a nonionic emulsifying agent, and more preferably, may be a nonionic emulsifying agent having a hydrophile-lipophile balance (HLB) in the range of 10 to 18.

Further, the present invention provides a method of preparing a filter medium, including: (1) preparing a spinning solution including fiber-forming ingredients including polyacrylonitrile (PAN) and polyvinylidene fluoride (PVDF) and an emulsifying agent for improving the miscibility of the fiber-forming ingredients; and (2) preparing a fiber web layer formed of nanofibers by electrospinning the spinning solution.

According to one preferred embodiment of the present invention, Step (2) may include: 2-1) preparing a fiber web layer by electrospinning the spinning solution as a nanofiber; and 2-2) thermally bonding the support layer to the fiber web layer by heating the support layer and the fiber web layer.

Further, the method of preparing a filter medium may further include a step of disposing a support layer different from a support layer which is positioned below the fiber web layer on the fiber web layer between Steps 2-1) and 2-2).

Further, in order to improve spinnability, the emulsifying agent included in the nanofiber may be preferably a nonionic emulsifying agent, and more preferably, may be a nonionic emulsifying agent having a hydrophile-lipophile balance (HLB) in the range of 10 to 18.

Further, the present invention provides a flat filter unit, including: the filter medium according to the present invention; and a support frame having a flow path for allowing a filtrate filtered from the filter medium to flow out to the outside, and supporting a rim of the filter medium.

Further, the present invention provides a cylindrical filter unit, including: a porous penetrating water outflow pipe; the filter medium according to the present invention wound on the porous penetrating water outflow pipe; and an outer case for housing the filter medium wound on the porous penetrating water outflow pipe.

Moreover, the present invention provides a filter module, including a plurality of the filter units according to the present invention spaced a predetermined distance apart.

According to the present invention, the nanofiber has excellent mechanical strength and chemical resistance and, at the same time, significantly increased hydrophilicity without a separate surface modification/treatment to/on the nanofiber. Accordingly, a filter medium implemented by the nanofiber can exhibit excellent physical properties in a water treatment process in which a pressure equal to or more than a predetermined level is applied and which requires the filter medium to have high mechanical strength and in a water treatment process which requires chemical resistance as the liquid being filtered is strongly acidic or alkaline. Further, the filter medium can have improved flux and filtration efficiency due to excellent hydrophilicity. Moreover, since the nanofiber has significantly superior spinnability, the mass productivity of the filter medium is significantly improved, the unit costs of production can be reduced, and thus the filter medium can be widely used in the water treatment field.

BRIEF DESCRIPTION OF THE DRAWINGS

FIGS. 2A to 2C are cross-sectional views of a filter medium according to one embodiment of the present invention, in which FIG. 2A is a view showing a case where a fiber web layer is formed on one surface of a support layer, FIG. 2B is a view showing a case where support layers are formed on both surfaces of the fiber web layer and FIG. 2C is a view showing a case where fiber web layers are formed on both surfaces of the support layer.

FIGS. 4A and 4B are views of a flat filter unit according to an embodiment of the present invention, in which FIG. 4A is a perspective view of a flat filter unit, and FIG. 4B is a cross-sectional view taken along line X-X' in FIG. 4A.

DETAILED DESCRIPTION OF THE INVENTION

Figure 1:
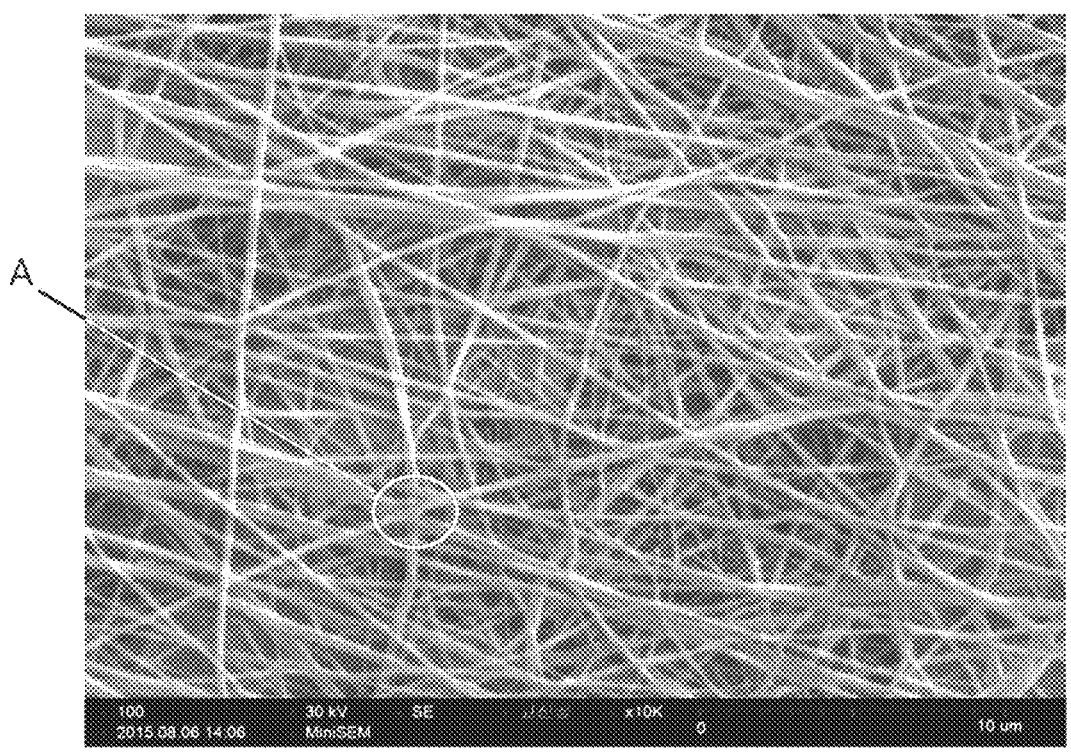
FIG. 1 is a SEM picture of a fiber web layer according to one embodiment of the present invention.

Hereinafter, embodiments will be described in detail with reference to the accompanying drawings so that those skilled in the art can easily carry out the embodiments. However, the embodiments may not be limited to those described below and may have various modifications. In addition, only components related to the embodiment are shown in drawings for the clarity of explanation and the same reference numerals will be assigned to the same or similar elements throughout the specification.

The nanofiber according to one embodiment of the present invention includes fiber-forming ingredients including polyacrylonitrile (PAN) and polyvinylidene fluoride (PVDF) and an emulsifying agent for improving the miscibility of the fiber-forming ingredients.

First, the fiber-forming ingredients will be described.

The fiber-forming ingredients include polyacrylonitrile (PAN, hereinafter referred to as PAN) with high hydrophilicity and polyvinylidene fluoride (PVDF, hereinafter referred to as PVDF) with very high hydrophobicity.

The PVDF may secure the mechanical strength and chemical resistance of the nanofiber due to material properties thereof, and the PAN improves the hydrophilicity of the nanofiber due to having high hydrophilicity so as to prevent the hydrophobization of the nanofibers due to PVDF, which is a fiber-forming ingredient of a different type, and accordingly, a filter material prepared using the nanofiber may exhibit improved water permeability and chemical resistance at the same time. The PVDF may be selected from known materials without limitation, and thus is not particularly limited in the present invention. The weight average molecular weight of the PVDF may be in the range of 10,000 to 1,000,000, and preferably in the range of 20,000 to 800,000.

Further, the PAN may be selected from any known PANs obtained by polymerizing acrylonitrile and a comonomer, and the mol % in a copolymer, the type of the comonomer and the like are not particularly limited in the present invention. As a non-limiting example of the comonomer, one or more selected from the group consisting of methylacrylate, methylmethacrylate, vinylacetate, itaconic acid, acrylic acid, methacrylic acid, etc may be used. Further, as a non-limiting example of the acrylonitrile and comonomer content, the weight ratio may be in the range of 60 to 99.9:40 to 0.01. Further, in order to exhibit improved hydrophilicity and/or flexibility in the nanofiber, the PAN may include an alkoxycarbonyl or alkanonoxy in the ethylene skeleton and the side chain.

The weight average molecular weight of the PAN may be in the range of 3,000 to 500,000, and preferably in the range of 5,000 to 100,000. When the weight average molecular weight is less than 3,000, it is difficult to exhibit a desired degree of hydrophilicity in the nanofiber. When the weight average molecular weight is more than 500,000, spinnability may be remarkably lowered.

The aforementioned PVDF and PAN may be included in the fiber-forming ingredients so that PAN is included at 8 to 20 parts by weight based on 100 parts by weight of the PVDF. When the PAN is included at less than 8 parts by weight, since the nanofiber may not exhibit a desired degree of hydrophilicity, wettability is low, and the water permeability of the filter medium may be significantly reduced when the filter medium is prepared using the fiber-forming ingredients. When the PAN is included at more than 20 parts by weight, the water permeability of the filter medium may increase due to improved hydrophilicity, but the mechanical strength and chemical resistance of the nanofiber may be significantly deteriorated, and there may be a problem in mass productivity due to reduced spinnability.

Further, in addition to PVDF and PAN, the fiber-forming ingredients may include one or more different types of fluorine-based compounds selected from the group consisting of polytetrafluoroethylene (PTFE), perfluorinated acid (PFA), a fluorinated ethelene propylene (FEP) copolymer, polyethylene tetrafluoroethylene (ETFE), ethylene chlorotrifluoroethylene (ECTFE) and polychlorotrifluoroethylene (PCTFE), and may further include a hydrophilic polymer compound such as polyvinyl alcohol.

Next, the emulsifying agent included in the nanofiber according to one embodiment of the present invention will be described.

The emulsifying agent serves to improve the miscibility of the fiber-forming ingredients, and further improve the hydrophilicity of the nanofiber.

Even when both of PVDF and PAN are dissolved in a specific solvent as the aforementioned fiber-forming ingredients, the two ingredients are not mixed uniformly in the solution due to having different properties, and even in a case of being mixed, the two ingredients are only temporarily mixed by stirring or the like, and separation of the two ingredients from the solution may easily occur over time. When such a solution is used as a spinning solution, the electrospun nanofiber is in a state in which the two ingredients are not mixed, and specifically, the nanofiber having a structure in which, one ingredient is spatially arranged like islands on the basis of another ingredient, or one ingredient is continuous and then another ingredient is continuous, may be prepared, and thus the desired hydrophilicity and chemical resistance may not be uniformly exhibited at the same time. Further, since the nanofiber portion in which PAN is concentrated may be easily broken, mechanical strength is lowered, thereby significantly deteriorating the durability of the filter medium prepared therefrom.

Accordingly, it is necessary to mix two components having different properties so that the two components are evenly dispersed in the nanofiber. To this end, an emulsifier is necessarily required. The emulsifying agent may include one or more selected from the group consisting of a cationic emulsifying agent, an anionic emulsifying agent, an amphoteric emulsifying agent and a nonionic emulsifying agent. However, the emulsifying agent may be a nonionic emulsifying agent for improving the spinnability and diameter uniformity of the nanofiber. When two or more types of emulsifying agents are mixed and used, one of the emulsifying agents is preferably a nonionic emulsifying agent. When a nonionic emulsifying agent is not included, for example, when an emulsifying agent is an ionic emulsifying agent, as electrical conductivity of a spinning solution is increased, the spinnability into fibers is notably decreased, and thus the solution is spun into beads or formed into a nanofiber including beads, causing low uniformity of the diameter of the nanofiber and non-uniform pore distribution in the fiber web layer.

The emulsifying agent may be selected from any known emulsifying agents, and is not particularly limited in the present invention.

Among the emulsifying agents, specific examples of the nonionic emulsifying agent that improves spinnability and uniformity include known nonionic emulsifying agents without limitation, and non-limiting examples thereof include an ethoxylate compound (e.g. alkylphenol polyethylene oxide condensate) synthesized by adding ethylene oxide to a hydrophobic compound such as a linear aliphatic hydrocarbon, an esterified product of a compound having a polyfunctional hydroxyl group or an adduct obtained by adding ethylene oxide to the esterified product, an adduct in which ethylene oxide is added to fatty acids, etc. Specifically, one or more of sugar alcohol fatty acid esters such as sorbitan fatty acid esters, polyoxyethylene sorbitan fatty acid esters and sucrose fatty acid esters, polyhydric alcohol fatty acid esters such as glycerin fatty acid esters, polyglycerin fatty acid esters, polyoxyethylene glycerin fatty acid esters, and polyethylene glycol fatty acid esters, ether type or ester type surfactants such as polyoxyethylene alkyl ethers, polyoxyethylene polyoxypropylene copolymers, polyoxyethylene alkyl phenyl ethers, and polyoxyethylene hydrogenated castor oil, and polyoxyethylene hydrogenated castor oil, fatty acid alkanolamides such as lauric acid diethanolamide may be used in combination as the nonionic emulsifying agent.

Further, a nonionic emulsifying agent included in the nanofiber according to one embodiment of the present invention may satisfy a hydrophile-lipophile balance (HLB) in the range of 10 to 18, and preferably in the range of 13 to 16. When a hydrophile-lipophile balance is less than 10, the degradation of miscibility of PVDF and PAN by the emulsifying agent may decrease the wettability of the nanofiber, and the diameter uniformity of spun nanofibers may be significantly lowered due to a decrease in miscibility and non-uniformity of solvent volatilization during spinning. Further, when the hydrophile-lipophile balance is more than 18, an emulsifying agent may be aggregately distributed during fiber formation, and may be susceptible to the influence of ambient temperature and humidity during spinning, solvent volatilization in a spinning solution may be non-uniform, and thus the diameter uniformity of the spun nanofibers may be significantly lowered. When one type of an emulsifying agent is included, a hydrophile-lipophile balance (HLB) of the emulsifying agent may be a hydrophile-lipophile balance of the corresponding component, and when two or more types of emulsifying agents are mixed, a hydrophile-lipophile balance (HLB) of the emulsifying agent may be a value of the hydrophile-lipophile balance finally calculated in consideration of the content and hydrophile-lipophile balance of each of the components.

Further, the emulsifying agent included in the nanofiber according to one embodiment of the present invention may be included at 0.5 to 8 parts by weight based on 100 parts by weight of the fiber-forming ingredients, and preferably at 1 to 5 parts by weight. When the nonionic emulsifying agent is included at less than 0.5 part by weight, phase separation of PVDF and PAN may occur before spinning, and accordingly the wettability of the fiber web may be non-uniform. Further, when the emulsifying agent is included at more than 8 parts by weight, the nanofiber is susceptible to the influence of ambient temperature and humidity during spinning, and solvent volatilization in a spinning solution may be non-uniform so that the diameter uniformity of the spun nanofibers may be significantly lowered, and thus it may be difficult to implement a fiber web having a desired pore size.

Further, the nanofiber according to one embodiment of the present invention may have a diameter in the range of 0.05 to 2 μm, and an aspect ratio in the range of 1000 to 100000, but the present invention is not limited thereto.

The nanofiber for a filter medium according to one embodiment of the present invention as described above may form a fiber web layer having a three-dimensional network structure and may be included in a filter medium. Referring to FIG. 1, the nanofibers which include fiber-forming ingredients including polyacrylonitrile PAN) and polyvinylidene fluoride (PVDF) and an emulsifying agent are stacked perpendicularly to a spinning surface. Here, due to a solvent which is not volatilized or evaporated in the air during spinning, melt bonding (A) may occur at the portion in which surfaces of the stacked nanofibers are in contact to form a three-dimensional network structure, and a fiber web having an enhanced three-dimensional network structure is formed by primary calendering in a preparation method which will be described below.

The fiber web layer may have a thickness in the range of 0.5 to 200 μm, a porosity in the range of 40 to 90%, an average pore size in the range of 0.1 to 5 μm, a basis weight in the range of 0.05 to 100 g/m$^2$, but is not limited thereto, and may be appropriately changed in consideration of the desired water permeability and filtration efficiency.

Further, the fiber web layer may be provided as one or more layers in the filter medium, and the porosity, pore size, basis weight and/or thickness of each fiber web layer may be different.

Figure 2A:
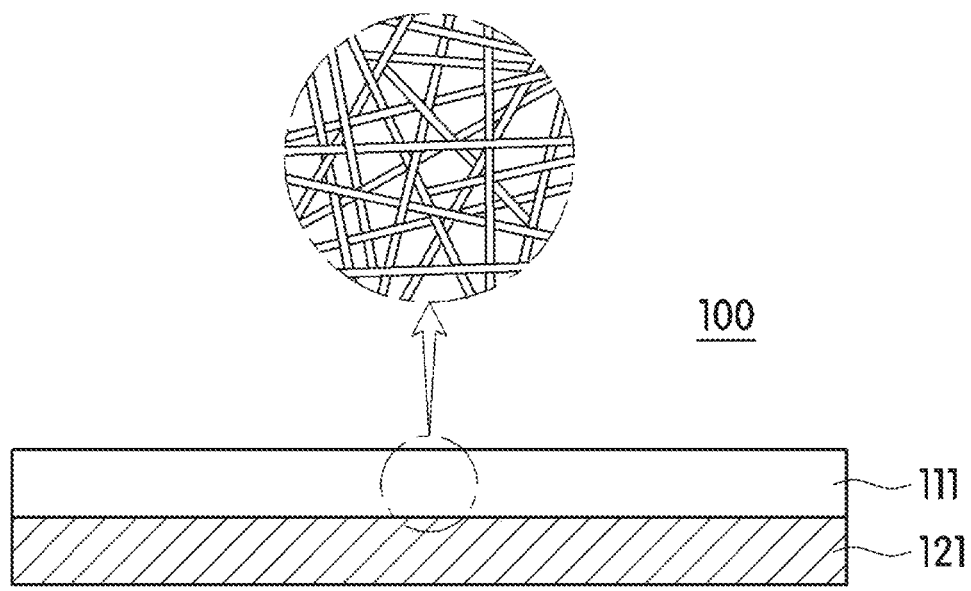
Figure 2B:
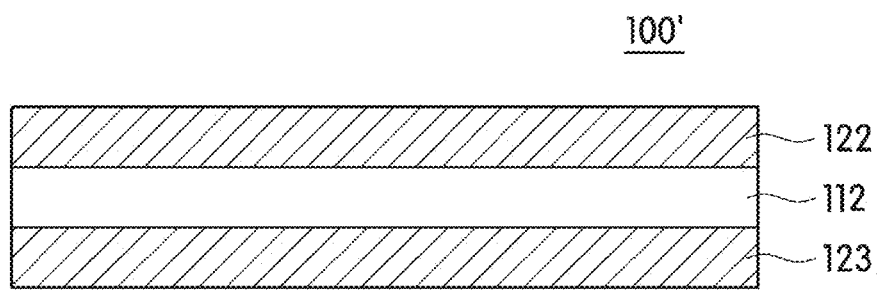
Figure 2C:
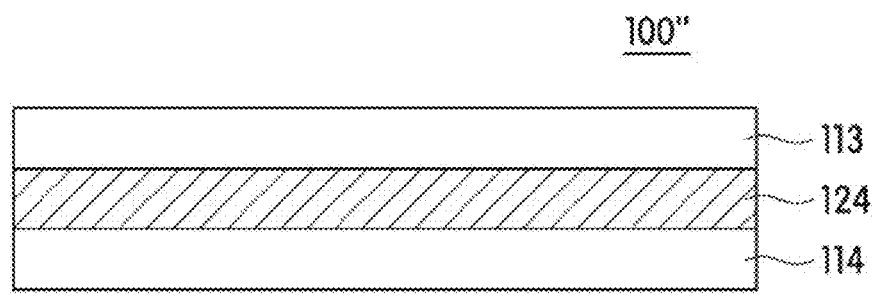

Further, as shown in FIG. 2A, the filter medium 100 according to one embodiment of the present invention may include a support layer 121 formed on one surface of a fiber web layer 111, and may include support layers 122 and 123 formed on both surfaces of a fiber web layer 112 as shown in FIG. 2B, and fiber web layers 113 and 114 may be formed on both surfaces of a support layer 124 as shown in FIG. 2C.

The support layers 121, 122, and 123 are not particularly limited as long as they generally serve as a support for a filter medium, but may preferably be a woven fabric, a knitted fabric or a nonwoven fabric. The term "fabric" represents that fibers included in the fabric have longitudinal and transverse directionalities, and the specific structure thereof may be a plain weave, a twilled weave and the like, and the density of warp and weft yarn is not particularly limited. Further, the knitted fabric may have a knit structure known in the related field, and may be a weave knitted fabric, a light knitted fabric and the like, but is not particularly limited thereto. Further, the term "nonwoven fabric" represents that fibers included in the nonwoven have no longitudinal or transverse directionality, and a nonwoven fabric manufactured by a known method such as a dry nonwoven fabric such as a chemical bonding nonwoven fabric, a thermal bonding nonwoven fabric, and an airlaid nonwoven fabric, a wet nonwoven fabric, a spunless nonwoven fabric, a needle punching nonwoven fabric, a meltblown nonwoven fabric may be used.

The support layers 121, 122, and 123 may be formed of any material without limitation, and non-limiting examples thereof include synthetic polymer components selected from the group consisting of polyester-, polyurethane-, polyolefin-, and polyamide-based components; or natural polymer components including cellulose-based components may be used. However, the material of the support layer preferably includes a known low-melting point component such as a known low-melting point polyester and a low-melting point polyethylene capable of thermal bonding in order to prevent separation of the support layer from the fiber web layer during the water treatment process of the filter medium by improving the binding force with the fiber web layers 111 to 114 described above, and to prevent a decrease in water permeability due to pore clogging due to the use of a separate adhesive component and fumes generated during lamination. Specifically, the support layer may be a low-melting-point composite fiber including a supporting component and a low-melting point component such that at least a part of the low-melting point component is exposed to the external surface. The composite fiber may be, for example, a sheath-core type composite fiber in which a supporting component forms a core portion and a low-melting point component forms a sheath portion surrounding the core portion, or a side-by side composite fiber in which the low-melting point component is disposed on one side of the supporting component. The low-melting-point component and the supporting component may be polyolefin-based components in view of flexibility and elongation of a support. For example, the supporting component may be polypropylene and the low-melting component may be polyethylene. The melting point of the low-melting point component may be in the range of 60 to 180° C.

Further, the support layers 121, 122 and 123 may have a thickness in the range of 50 to 200 μm, but are not limited thereto.

Further, a process of preparing a nanofiber and a filter medium including a fiber web layer with a three-dimensional network structure using the nanofiber will be described. The filter medium according to one embodiment of the present invention may be prepared through a non-continuous process, in which nanofibers are prepared separately and a fiber web layer is prepared using the nanofibers, or through a continuous process in which a process of preparing nanofibers to a process of preparing a filter medium is continuous. Hereinafter, the process of preparing a filter medium through a continuous process will be described after the description of the process of preparing a filter medium through a non-continuous process.

First, the fiber web layer may be prepared independently by spinning the nanofibers for the production of filter media through a non-continuous process. As Step (A) for preparing the nanofiber according to the present invention, a step of preparing a spinning solution including fiber-forming ingredients including polyacrylonitrile (PAN) and polyvinylidene fluoride (PVDF) and an emulsifying agent for improving the miscibility of the fiber-forming ingredients is performed.

The description of the PAN, PVDF and emulsifying agent in the spinning solution is the same as that described above, and thus will be omitted.

The fiber forming ingredients may be contained in the spinning solution at 5 to 30 wt %, and preferably at 8 to 20 wt %. When the fiber forming ingredients are included at less than 5 wt %, it is difficult to form fibers, and the spinning solution is not spun into a fiber and spun in droplets to form a film phase, and even if spinning is performed, the volatilization of solvent is not performed well because many beads are formed, so that pores may be clogged in a calendering process which will be described below. Further, when the fiber-forming ingredients are contained at more than 30 wt %, viscosity increases so that solidification occurs on the surface of the solution, and thus it is difficult to spin for a long time. Further, the fiber diameter may increase, and thus a fibrous phase with a sub-micrometer size may not be formed.

The spinning solution may further include a solvent. The solvent may be used without limitation as long as the solvent does not cause precipitation while dissolving the fiber-forming ingredients and does not affect the spinnability of the nanofiber which will be described below. Preferably, the spinning solution may include one or more selected from the group consisting of γ-butyrolactone, cyclohexanone, 3-hexanone, 3-heptanone, 3-octanone, N-methylpyrrolidone, dimethylacetamide, dimethyl sulfoxide and dimethylformamide.

Next, as Step (b), nanofibers may be prepared by electrospinning the spinning solution.

The electrospinning device may be any known electrospinning device, and may be an electrospinning device having a single spinning pack with one spinning nozzle, or may be an electrospinning device having a plurality of single spinning packs or a spinning pack with a plurality of nozzles. Further, in an electrospinning process, dry spinning or wet spinning with an external coagulation bath may be used, and the method is not limited.

When a stirred or agitated spinning solution is injected into the electrospinning device and electrospun on a collector such as paper, a desired nanofiber may be obtained. A specific description of the electrospinning process will be described in detail in a continuous process to be described below. The nanofibers accumulated and collected on the collector have a three-dimensional network structure, and heat and/or pressure is applied to the collected nanofibers to have desired water permeability of the filter medium, a suitable porosity, pore size, basis weight and the like suitable for exhibiting filtration efficiency, and thereby a fiber web layer having a three-dimensional network structure may be prepared. As a specific method of applying the heat and/or pressure, a known method may be adopted. As a non-limiting example thereof, a common calendering process may be used, and the temperature of the applied heat may be in the range of 70 to 190° C. Further, when the calendering process is carried out, the process may be carried out several times, for example, a drying process for removing the solvent and moisture remaining in the nanofibers through first calendering, and secondary calendering may be performed to control porosity and improve strength. Here, the degree of heat and/or pressure applied in each calendering process may be the same or different.

Next, as Step (c), a prepared fiber web layer may be stacked on a support layer such as the aforementioned nonwoven fabric to bind the fiber web layer and the support layer through retreatment of heat and/or pressure, and when the nonwoven fabric contains low melting point fibers, the nonwoven fabric which is partially molten due to heat may be thermally bonded to the fiber web layer. A separate hot melt powder or hot melt web may also be interposed to bond the two layers. In this case, the temperature of the applied heat may be in the range of 60 to 190° C., and a pressure in the range of 0.1 to 10 kgf/cm$^2$ may be applied, but the present invention is not limited thereto.

Next, a process of preparing a filter medium through a continuous process will be described.

First, as Step (1), a step of preparing a spinning solution which includes fiber-forming ingredients including polyacrylonitrile (PAN) and polyvinylidene fluoride (PVDF) and an emulsifying agent for improving the miscibility of the fiber-forming ingredients is performed. The description of Step (1) is the same as that described above and will be omitted.

Next, as Step (2), a step of preparing a fiber web layer formed of nanofibers by electrospinning the spinning solution is performed.

Figure 3:
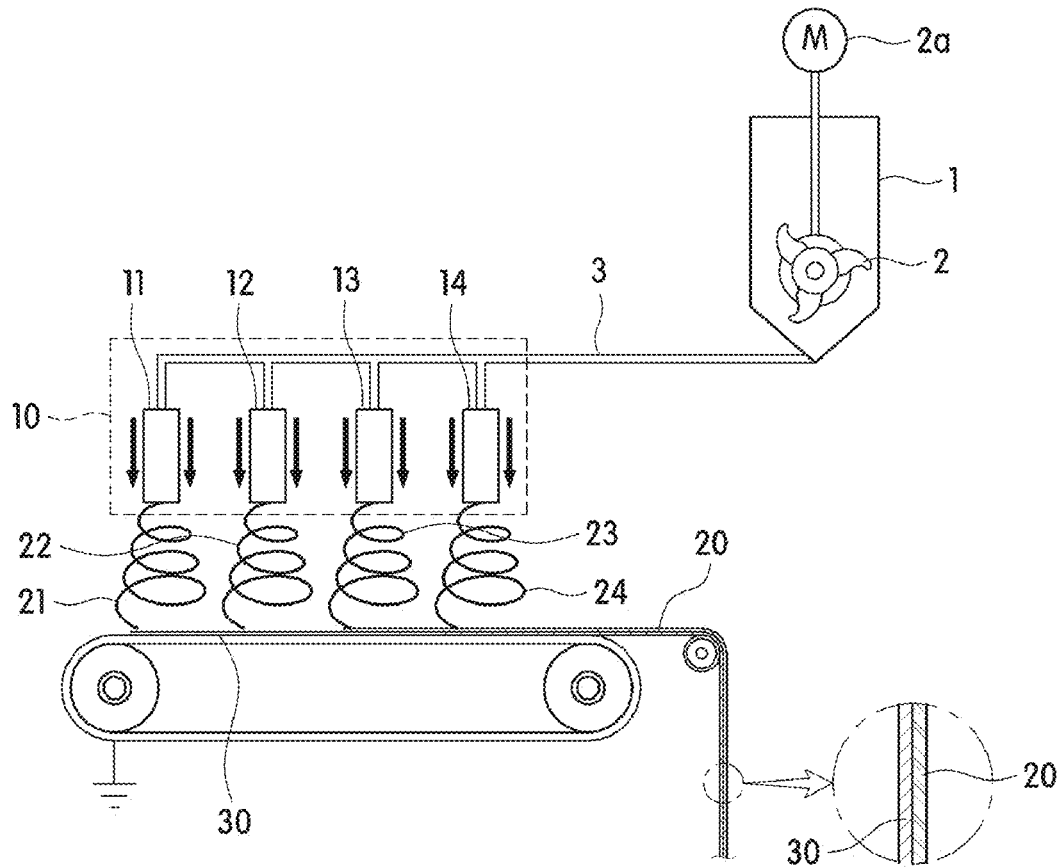
FIG. 3 is a schematic view of an electrospinning device capable of producing a filter medium according to an embodiment of the present invention through a continuous process.

Referring to FIG. 3, electrospinning may be performed by an electrospinning device including a solution tank 1, in which the spinning solution prepared in Step 1 is stored, and a spinning pack 10 in which a plurality of spinning nozzles 11 to 14 connected to a high voltage generator (not shown) are arranged in a plurality of rows or columns. The spinning pack 10 is disposed above a grounded collector 6 in the form of a conveyor moving at a predetermined speed, and a plurality of spinning nozzles are arranged at a predetermined distance so as to be orthogonal to the traveling direction of the collector 6. For convenience of explanation, FIG. 3 shows an electrospinning device in which four spinning nozzles are arranged at a predetermined distance along the traveling direction of the collector 6. The number of the spinning nozzles may be, for example, 30 to 60, or more as necessary. When a plurality of spinning nozzles are used as described above, the rotation speed of the collector 6 may be increased to improve productivity.

The solution tank 1 may contain a stirrer 2 using a mixing motor 2a as a driving source and may be connected to the spinning nozzles 11 to 14 of each row through a metering pump not shown in the drawing and a transfer tube 3. The spinning solution sequentially discharged from the spinning nozzles 11 to 14 of four rows is discharged as each of the nanofibers 21 to 24 while passing through the spinning nozzles 11 to 14 charged by a high voltage generator, and is sequentially accumulated on a grounded collector 6 in the form of a conveyor moving at a predetermined speed to form a fiber web 20.

In the case of using the spinning pack 10 having a plurality of spinning nozzles for mass production, mutual interference occurs so that fibers are blown away and are not collected. As a result, a nanofiber web thus obtained becomes too bulky, acting as a cause of spinning trouble.

In order to solve this problem, a plurality of air jet nozzles (not shown) may be provided for each of the spinning nozzles 11 to 14 of each row of the spinning pack 10 so that air is emitted to the ground (or in the direction of the collector) simultaneously with electrospinning to form a fiber web 20.

The injected air helps to rapidly volatilize the solvent contained in the electrospun nanofibers 21 to 24, solidify the fiber-forming ingredients and collect and accumulate the spun nanofibers on the collector, thereby reducing spinning trouble, and helps to obtain nanofibers with improved mechanical strength.

In the air injection nozzle provided for each nozzle of the spinning pack 10, the air pressure of the air injection may be set as 0.01 to 0.2 MPa. When the air pressure is less than 0.01 MPa, it may not contribute to collection and accumulation. When the air pressure is more than 0.2 MPa, the cone of the spinning nozzle is hardened to generate blocking of needles, causing spinning trouble.

Further, when the spinning solution is prepared as described above and then spinning process is performed by an air electrospinning (AES) method using the spinning pack 10 having a plurality of spinning nozzles, the temperature and humidity inside a spinning chamber affects a spinning fiber and volatilization of a solvent. When proper conditions are not set, the fiber is not properly formed or it is difficult to control the diameter of the fiber. Further, as beads are locally formed on the surface of the fiber, there is a problem that pores may be clogged in the pore control and heat treatment process of the fiber web which will be described below.

It is preferable that the temperature and humidity inside the spinning chamber are set to be constant when the spinning solution is continuously and sequentially spun through four rows of spinning nozzles 11 to 14. When the temperature and humidity conditions inside the spinning chamber are different, either the spinning nozzle 11 of the first row or the spinning nozzle 12 of the second row may not spin, or the web produced according to the following process and the web produced according to the previous process may be separated due to decreased adhesion. The temperature of the spinning chamber is preferably set as 20 to 30° C., and the humidity thereof may be set as 20 to 50%.

Further, when the spinning solution is spun, the injection rate of the spinning solution per nozzle 11 to 14 may be in the range of 10 to 30 μl/min. Further, a distance between the tip of the nozzle and the collector may be in the range of 10 to 30 cm. However, the present invention is not limited thereto, and may be changed according to purpose.

As shown in FIG. 3, when the electrospun nanofibers 21 to 24 are collected on top of the collector as a conveyor belt type, a support layer 30 capable of serving as a support for the filter media may be arranged on the collector, and the spun nanofibers 21 to 24 may be accumulated on the support layer 30 to form the fiber web layer 20 formed of the nanofibers 21 to 24 (Step 2-1).

Thereafter, heat or pressure may be applied (Step 2-2) for control of the pore size of the fiber web layer 20 formed on the support layer 30, control of porosity, drying of the solvent and moisture remaining in the nanofibers, improvement of mechanical strength of the fiber web layer and bonding between the support layer 30 and the fiber web layer 20. Accordingly, when the support layer 30 and the fiber web layer 20 are bound to each other or the support layer 30 includes low melting point fibers, the support layer 30 partially melted by heat is thermally fused and bonded to the fiber web layer 20. Further, a separate hot melt powder or hot melt web may be further interposed to bind the two layers 20 and 30, but as described above, the use of a separate adhesive component may adversely affect the filter medium, and thus it is preferable not to use the separate adhesive component. Here, the temperature of the applied heat may be in the range of 60 to 190° C., and the pressure may be in the range of 0.1 to 10 kgf/cm$^2$, but the present invention is not limited thereto. Further, the process of applying heat and/or pressure may be performed by a common calendering process, and the calendering process may be performed once or several times depending on the purpose.

Further, according to one embodiment of the present invention, after Step 2-1) and before Step 2-2), another support layer (not shown) may be laminated on a surface opposite to one surface of the fiber web layer 20 on which the support layer 30 is formed, and then Step 2-2) is performed to prepare the filter medium as shown in FIG. 2B.

Further, after Step 2-1) is performed, a fiber web layer (not shown), which is separately prepared through the above-described non-continuous production process of the filter medium, is laminated on a surface opposite to one surface of the support layer 30 formed on one fiber web layer 20, and then Step 2-2) is performed to prepare the filter medium as shown in FIG. 2C. However, the present invention is not limited thereto, and the filter medium as shown in FIG. 2C may be prepared by laminating two different fiber web layers separately prepared through the non-continuous production process of the filter medium on both surfaces of the support layer.

The filter medium according to one embodiment of the present invention manufactured by the above-described manufacturing method may be implemented as a filter unit.

Figure 4A:
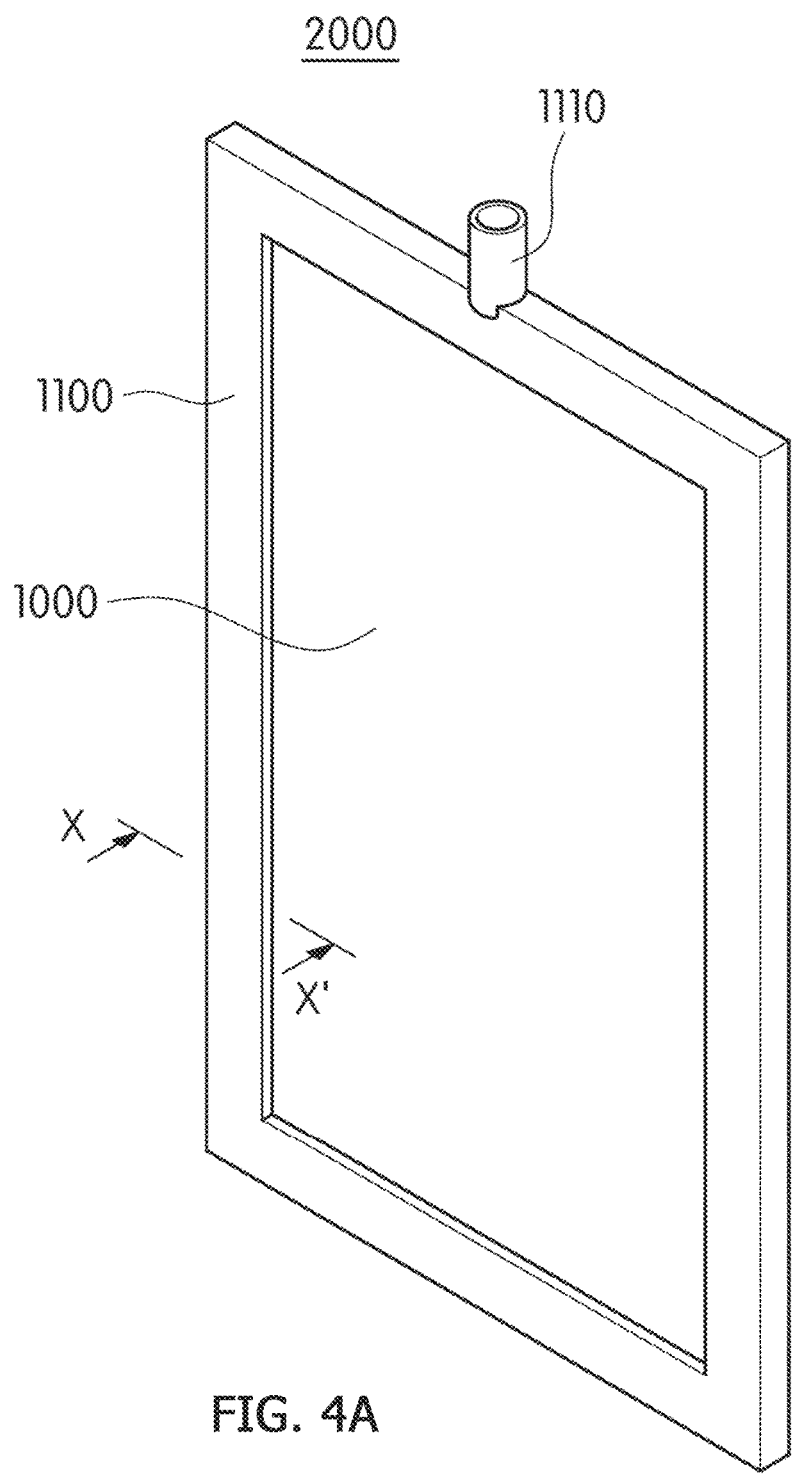

For example, as shown in FIG. 4A, a filter medium 1000 may be implemented as a flat filter unit 2000. Specifically, the flat filter unit 2000 includes a filter medium 1000 and a support frame 1100 for supporting the rim of the filter medium 1000, and an inlet port 1110 may be provided in any one region of the support frame 1100 to allow a pressure difference between the outside of the filter medium 1000 and the inside of the filter medium 1000 to be formed. Further, the support frame 1100 is provided with a flow path for allowing a filtrate filtered from the fiber web layers 101 and 102 to flow out to the outside through the support layer 200 inside the filter medium 1000.

Figure 4B:
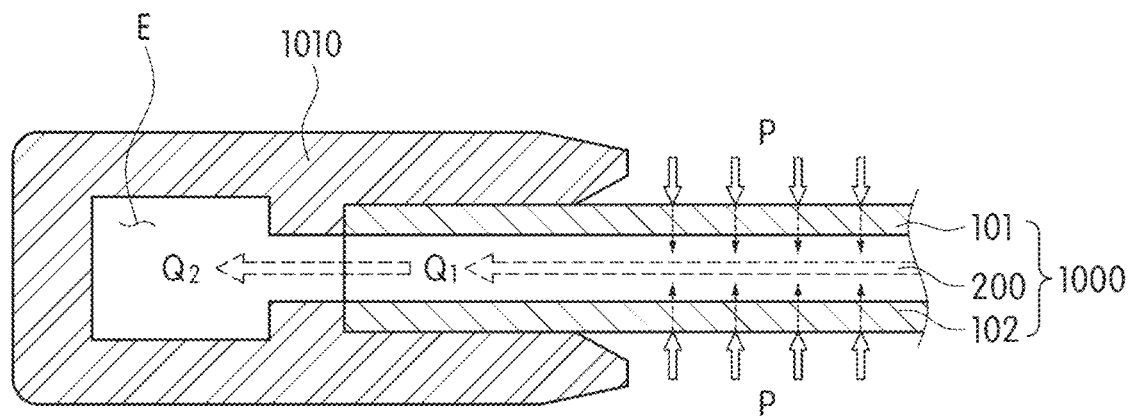

Specifically, when the filter unit 2000 as shown in FIG. 4A is applied with a high-pressure suction force through the inlet port 1110, the liquid P to be filtered, which is disposed outside the filter medium 1000, is directed toward the inside of the filter medium 1000 as shown in FIG. 4B, the filtrate Q1 filtered through the fiber web layers 101 and 102 flows along the flow path formed through the support 200 and then flows into a flow path E provided in the outer frame 1100. The filtrate Q2 flowed thereto may be discharged to the outside through the inlet port 1110.

Further, the flat filter unit 2000 as shown in FIG. 4A can implement a plurality of filter modules spaced apart from each other by a predetermined distance in one outer case, and a plurality of such filter modules may be stacked and formed into blocks to form a large water treatment apparatus.

Figure 5:
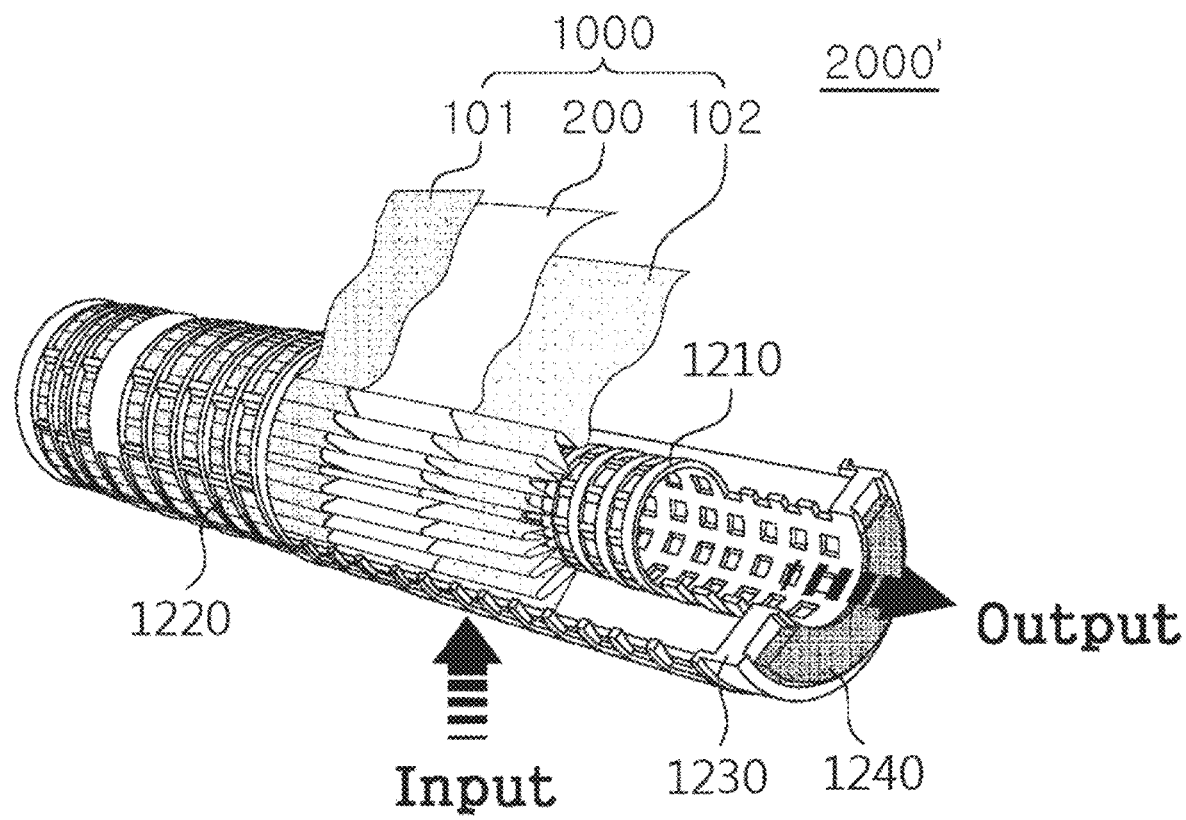
FIG. 5 is an exploded perspective view showing a cylindrical filter unit in which a filter medium according to one embodiment of the present invention has a bent cylindrical shape.

As another example, as shown in FIG. 5, the filter medium 1000 may be implemented as a cylindrical filter unit 2000'. Specifically, the cylindrical filter unit 2000' includes a porous penetrating water outflow pipe 1210, a filter medium 1000 wound on the porous penetrating water outflow pipe 1210, and an outer case 1220 for housing the filter medium 1000 wound on the porous penetrating water outflow pipe 1210. Here, the filter medium 1000 may be wound on the porous penetrating water outflow pipe 1210 in a bent shape as shown in FIG. 5 to increase an effective filtration surface area, and may be assembled inside the outer case 1220 and fixed by an end cap 1230. Further, an o-ring or gasket 1240 to be assembled to the pipe through which the filtered permeated water is discharged may be further provided. The filter unit 2000' as shown in FIG. 5 has a structure in which filtered supernatant is introduced into the filter unit 2000' through the side surface thereof and a filtrate filtered through the filter medium 1000 may be discharged through the porous penetrating water outflow pipe 1210 and collected.

The present invention will now be described more specifically with reference to the following examples, but the following examples should not be construed as limiting the scope of the present invention.

EXAMPLES

Example 1

First, 9 parts by weight of polyacrylonitrile (PAN, Dolan Corporation, N-PAN, a weight average molecular weight of 85,000) was mixed based on 100 parts by weight of polyvinylidene fluoride (Arkema Inc., Kynar 761) as a fiber-forming ingredient, and 12 g of the thus prepared fiber-forming ingredient was dissolved in 88 g of dimethylacetamide at a temperature of 80° C. for 6 hours using a magnetic bar to prepare a mixed solution. Thereafter, the mixed solution was cooled to room temperature, and 3 parts by weight of a nonionic emulsifying agent (Daejung Chemical and Metals Co., Ltd, Tween 80, a hydrophile-lipophile balance of 15) was included based on 100 parts by weight of the fiber-forming ingredient to prepare a spinning solution. The spinning solution was added into a solution tank of the electrospinning device as shown in FIG. 3, and discharged at a rate of 15 µl/min/hole. Here, the temperature of the spinning section was maintained at 28° C., the humidity was maintained at 40%, the distance between the collector and the tip of the spinning nozzle was 18 cm, and the thickness of the support layer on the collector was 100 µm. After a non-woven fabric (Namyang Nonwoven Fabric Co., Ltd, CCP40) formed of a low-melting point composite fiber including a low-melting point polyethylene as a sheath part and polypropylene as a core part was disposed, a voltage of 40 kV was applied to a spin nozzle pack using a high voltage generator, and at the same time, an air pressure of 0.03 MPa was provided to each nozzle of the spin pack to prepare a fiber web formed on one surface of a nonwoven fabric and formed of PAN/PVDF nanofibers. Next, heat treatment was performed at a temperature of 160° C. to dry the solvent and moisture remaining in the fiber web, and a calendaring process was performed twice at a temperature of 185° C. and a pressure of 1 kgf/cm$^2$ to prepare a filter medium.

Examples 2 to 15

A filter medium as shown in the following Table 1, Table 2 or Table 3 below was prepared in the same manner as in Example 1 except that the composition of the spinning solution is changed as shown in the following Table 1, Table 2 or Table 3.

Here, the types of changed emulsifying agents are shown in the following Table 4.

Comparative Example 1

A filter medium as shown in Table 3 was prepared in the same manner as in Example 1 except that electrospinning was performed using a spinning solution prepared without adding an emulsifying agent.

Experimental Example

The following properties of the filter media prepared in the examples and comparative examples were evaluated and shown in the following Table 1, Table 2 or Table 3.

1. Spinnability

SEM photographs were taken at a magnification of 2000× with respect to the surface of the spun fiber web, the total number of fibers and the number of beads were counted on the photographed image, and then spinnability was calculated according to the following Mathematical Equation 1.

$$\text{Spinnability}(\%) = \frac{\text{Total number of fibers} - \text{number of beads}}{\text{Total number of fibers}} \times 100 \quad \text{[Mathematical Equation 1]}$$

2. Uniformity of Diameter of Fiber Web Nanofibers

The average diameter and standard deviation of the nanofibers forming the fiber web were measured through a program (manufactured by Amogreentech Co., Ltd.) which measures a fiber diameter using a contrast ratio of the image obtained after photographing the SEM image of a surface of the spun fiber web and the slope of the fiber. The diameter uniformity was calculated according to the following Mathematical Equation 2 using the measured average diameter and standard deviation.

$$\text{Uniformity of nanofiber diameter}(\%) = \frac{\text{Standard deviation of nanofiber diameter (nm)}}{\text{Average diameter of nanofiber (nm)}} \times 100 \quad \text{[Mathematical Equation 2]}$$

3. Wettability of Fiber Web

In order to evaluate the miscibility of PVDF and PAN as the fiber-forming ingredients of the nanofiber, water was sprayed onto the upper portion of the surface of the fiber web of the filter medium having a width of 20 cm and a length of 20 cm. Then, the degree of wetting of the surface of the fiber web by the sprayed water was confirmed with the naked eye, the area of the wetted portion of the fiber web was measured, and the measured value was converted into a percentage based on the total area.

In the same content of PAN, the higher the miscibility, the larger the wetted area was. Further, when the hydrophilicity of the nanofiber is low such as a case in which the PVDF and the PAN are separated or the content of the PAN is low, an unwet area is formed.

TABLE 1

|  |  | Example 1 | Example 2 | Example 3 | Example 4 | Example 5 | Example 6 |
|---|---|---|---|---|---|---|---|
| Spinning solution | PVDF (parts by weight) | 100 | 100 | 100 | 100 | 100 | 100 |
|  | PAN (parts by weight) | 9 | 9 | 9 | 9 | 9 | 9 |
|  | Emulsifying agent (type/content[1]/HLB) | Nonionic/3/15 | Nonionic/0.3/15 | Nonionic/0.7/15 | Nonionic/8.5/15 | Cationic/3/10 | Anionic/3/40 |
| Filter medium | Spinnability (%) | 100 | 97.2 | 99.97 | 95.46 | 83.52 | 79.9 |
|  | Uniformity of diameter of nanofibers (%) | 15.26 | 34.16 | 22.34 | 41.23 | 61.42 | 66.89 |
|  | Wettability (%) | 100 | 100 | 100 | 100 | 100 | 100 |

[1] The unit of the content is "parts by weight" based on 100 parts by weight of fiber-forming ingredients

TABLE 2

|  |  | Example 7 | Example 8 | Example 9 | Example 10 | Example 11 |
|---|---|---|---|---|---|---|
| Spinning solution | PVDF (parts by weight) | 100 | 100 | 100 | 100 | 100 |
|  | PAN (parts by weight) | 9 | 9 | 9 | 9 | 9 |
|  | Emulsifying agent (type/content[1]/HLB) | Amphoteric/3/13 | Nonionic/3/8.6 | Nonionic/3/11 | Nonionic/3/16.7 | Nonionic/3/19.1 |
| Filter medium | Spinnability (%) | 82.15 | 96.18 | 99.12 | 97.30 | 95.64 |
|  | Uniformity of diameter of nanofibers (%) | 62.10 | 38.59 | 24.46 | 26.11 | 41.48 |
|  | Wettability (%) | 100 | 100 | 100 | 100 | 100 |

[1] The unit of the content is "parts by weight" based on 100 parts by weight of fiber-forming ingredients.

TABLE 3

|  |  | Example 12 | Example 13 | Example 14 | Example 15 | Comparative Example 1 |
|---|---|---|---|---|---|---|
| Spinning solution | PVDF (parts by weight) | 100 | 100 | 100 | 100 | 100 |
|  | PAN (parts by weight) | 3 | 7 | 18 | 22 | 9 |
|  | Emulsifying agent (type/content[1]/HLB) | Nonionic/3/15 | Nonionic/3/15 | Nonionic/3/15 | Nonionic/3/15 | 0 |

TABLE 3-continued

|  |  | Example 12 | Example 13 | Example 14 | Example 15 | Comparative Example 1 |
|---|---|---|---|---|---|---|
| Filter medium | Spinnability (%) | 100 | 100 | 100 | 98.56 | 75.61 |
|  | Uniformity of diameter of nanofibers (%) | 17.59 | 19.37 | 28.4 | 30.22 | 44.81 |
|  | Wettability (%) | 0 | 12 | 100 | 100 | 15 |

1)The unit of the content is "parts by weight" based on 100 parts by weight of fiber-forming ingredients.

It can be seen from Tables 1 to 3 that, in the case of Comparative Example 1 in which an emulsifying agent is not contained, the miscibility of PVDF with PAN was poor, and thus wettability was significantly lowered as compared with Example 1.

Further, it can be confirmed that, in the case of examples in which cationic (Example 5), anionic (Example 6), and amphoteric (Example 7) emulsifiers are contained, spinnability is notably lower than that of Example 1 in which a nonionic emulsifying agent is contained. Further, it can be confirmed that the uniformity of diameter of nanofibers was poor because spinning was performed so that a large amount of beads are contained in the nanofibers.

Further, it can be seen that, even in the case where the nonionic emulsifying agent is contained, there was a difference in the uniformity of diameters of nanofibers depending on an HLB value and contents, and in the case of Examples 1 and 3, in which the content of the emulsifying agent is within the preferable range of the present invention, the uniformity of diameter is excellent as compared with Examples 2 and 4 in which the uniformity of diameter is out of the preferable range.

Further, it can be confirmed that, the uniformity of diameters of nanofibers in Examples 1, 9 and 10 in which the HLB values of the nonionic emulsifier are within the preferred ranges of the present invention, is superior to that of Examples 8 and 11 in which the HLB values of the nonionic emulsifier are out of the range.

Further, it may be confirmed that the wettability of Examples 12 and 13, in which the content of PAN is less than 8 parts by weight, is poor as compared with Example 1.

On the other hand, in the case of Example 15 in which the content of PAN is more than 20 parts by weight, there was no problem in the evaluation results of the uniformity of diameters of nanofibers and wettability as compared with Example 1, but the average diameter of a nanofiber is 300 nm in the case of Example 15 which is thicker than the average diameter of nanofiber of 214 nm in the case of Example 1, and thus it is disadvantageous for implementing a fiber web with a smaller pore size.

TABLE 4

|  | Types | Product name | HLB |
|---|---|---|---|
| Example 5 | Cationic | CTAB | 10 |
| Example 6 | Anionic | SLS | 40 |
| Example 7 | Amphoteric | Tego | 13 |
| Example 8 | Nonionic | Sorbitan laurate | 8.6 |
| Example 9 | Nonionic | Poly sorbate 85 | 11 |
| Example 10 | Nonionic | Tween 20 | 16.7 |
| Example 11 | Nonionic | PEG 80 sorbitan laurate | 19.1 |

The invention claimed is:

1. A nanofiber for a filter medium, comprising:
polyacrylonitrile (PAN);
polyvinylidene fluoride (PVDF); and
an emulsifying agent for improving miscibility of the PAN and PVDF,
wherein the emulsifying agent is a nonionic emulsifying agent which improves spinnability, and
wherein the nonionic emulsifying agent satisfies a hydrophile-lipophile balance (HLB) in a range of 10 to 18.

2. The nanofiber according to claim 1, wherein the polyacrylonitrile comprises 8 to 20 parts by weight based on 100 parts by weight of polyvinylidene fluoride.

3. The nanofiber according to claim 1, wherein the nanofiber includes the emulsifying agent at 0.5 to 8 parts by weight based on 100 parts by weight of the PAN and PVDF.

4. A filter medium, comprising a fiber web layer having a three-dimensional network structure and formed of a nanofiber which includes polyacrylonitrile (PAN), polyvinylidene fluoride (PVDF), and an emulsifying agent for improving miscibility of the PAN and PVDF,
wherein the emulsifying agent is a nonionic emulsifying agent which improves spinnability, and
wherein the nonionic emulsifying agent satisfies a hydrophile-lipophile balance (HLB) in a range of 10 to 18.

5. The filter medium according to claim 4, wherein the filter medium further includes a support layer formed on at least one surface of the fiber web layer.

6. The filter medium according to claim 4, wherein the fiber web layer has a thickness in a range of 0.5 to 200 μm, basis weight in a range of 0.5 to 100 g/m$^2$, a porosity in a range of 40 to 90%, and an average pore size in a range of 0.1 to 5 μm.

7. A flat filter unit, comprising:
the filter medium according to claim 4; and
a support frame having a flow path for allowing a filtrate filtered from the filter medium to flow out of the support frame, and supporting a rim of the filter medium.

8. A filter module, comprising a plurality of the filter units according to claim 7 spaced a predetermined distance apart.

9. A cylindrical filter unit, comprising:
a porous penetrating water outflow pipe;
the filter medium according to claim 4 wound on the porous penetrating water outflow pipe; and
an outer case for housing the filter medium wound on the porous penetrating water outflow pipe.

* * * * *